US011303644B2

(12) United States Patent
Yang et al.

(10) Patent No.: US 11,303,644 B2
(45) Date of Patent: Apr. 12, 2022

(54) SYSTEMS AND METHOD FOR AUTHENTICATING USERS OF A DATA PROCESSING PLATFORM FROM MULTIPLE IDENTITY PROVIDERS

(71) Applicant: Palantir Technologies Inc., Palo Alto, CA (US)

(72) Inventors: Lili Yang, San Mateo, CA (US); Mark Elliot, London (GB); Lam Tran, Menlo Park, CA (US); Robert Kruszewski, London (GB); Divyanshu Arora, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 75 days.

(21) Appl. No.: 16/662,466

(22) Filed: Oct. 24, 2019

(65) Prior Publication Data

US 2021/0112065 A1 Apr. 15, 2021

Related U.S. Application Data

(60) Provisional application No. 62/913,249, filed on Oct. 10, 2019.

(51) Int. Cl.
*G06F 21/30* (2013.01)
*G06F 21/62* (2013.01)
(Continued)

(52) U.S. Cl.
CPC ........ *H04L 63/102* (2013.01); *H04L 63/0815* (2013.01); *H04L 63/0876* (2013.01); *H04L 63/0884* (2013.01); *H04L 63/108* (2013.01)

(58) Field of Classification Search
CPC ............... H04L 63/102; H04L 63/0815; H04L 63/0876; H04L 63/0884; H04L 63/108; G06F 21/30; G06F 21/62; H04W 12/06
See application file for complete search history.

(56) References Cited

U.S. PATENT DOCUMENTS 7,657,639 B2 * 2/2010 Hinton ................ H04L 63/0815
709/229
2008/0021997 A1 1/2008 Hinton
(Continued)

FOREIGN PATENT DOCUMENTS

EP 3805961 A1 4/2021
WO 03/049000 A1 6/2003
WO WO-03049000 A1 * 6/2003 ............. G06F 21/41

OTHER PUBLICATIONS

"WAM Modernization and migration Guide"—OKTA, Feb. 14, 2019 https://www.okta.com/sites/default/files/pdf/WAM_modernization_guide_ebook.pdf (Year: 2019).*

(Continued)

*Primary Examiner* — Randy A Scott
(74) *Attorney, Agent, or Firm* — Faegre Drinker Biddle & Reath LLP (57) ABSTRACT

A system and method for authenticating users of a data processing platform stores a mapping of a unique user platform identifier to multiple user identity provider identifiers associated with multiple realms for a same user. In some examples, the method includes receiving a request from a client device to establish an access session to perform one or more actions on data of the data processing platform and receiving, from at least one of the first external identity provider of the first realm or the second external identity provider of the second realm, a user identity provider identifier associated with the request. In certain examples, the method includes granting permission to perform the one or more actions on the data of the data processing platform based at least in part on the received user identity provider identifier.

16 Claims, 5 Drawing Sheets

(51) Int. Cl.
*H04W 12/06* (2021.01)
*H04L 29/06* (2006.01)
*H04L 29/08* (2006.01)
*G06F 15/16* (2006.01)

(56) References Cited

U.S. PATENT DOCUMENTS

| | | | |
|---|---|---|---|
| 2010/0299313 A1* | 11/2010 | Orsini | H04L 63/20 707/652 |
| 2015/0263451 A1* | 9/2015 | Hashimoto | H01R 13/432 439/353 |
| 2015/0319156 A1 | 11/2015 | Guccione et al. | |
| 2017/0041504 A1* | 2/2017 | Fukuda | H04L 63/0807 |
| 2020/0117776 A1 | 4/2020 | de Souza et al. | |
| 2020/0272714 A1 | 8/2020 | de Souza et al. | |

OTHER PUBLICATIONS

"External Identity Providers"—OKTA Developer, Mar. 19, 2018 https://developer.okta.com/docs/concepts/identity-providers/#idp-discovery (Year: 2018).*

* cited by examiner

SYSTEMS AND METHOD FOR AUTHENTICATING USERS OF A DATA PROCESSING PLATFORM FROM MULTIPLE IDENTITY PROVIDERS

1. CROSS REFERENCE TO RELATED APPLICATIONS

This application claims priority to U.S. Provisional Application No. 62/913,249, filed Oct. 10, 2019, incorporated by reference herein for all purposes.

2. BACKGROUND

Certain embodiments of the present disclosure relate to data security over a network and/or to establishing access sessions in computing platforms. More particularly, some embodiments of the present disclosure provide systems and methods for authenticating users of a data processing platform that interface with a plurality of identity providers, for example external identity providers via a network.

Cloud computing is a computing infrastructure for enabling ubiquitous access to shared pools of servers, storage, computer networks, applications and other data resources, which can be rapidly provisioned, often over a network, such as the Internet. For example, a "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may, for example, be a data analysis application, a data transformation application, a report generating application, a machine learning process, a spreadsheet or a database, or part of a spreadsheet or part of a database, e.g. records.

Some companies provide cloud computing data processing services for registered customers, for example, manufacturing and technology companies, to create, store, manage and execute their own resources via a network. Users within the customer's domain, and other users outside of the customer's domain, e.g., support administrators of the provider company, may perform one or more actions on one or more data resources, which actions may vary from reading, authoring, editing, transforming, merging, or executing. Sometimes, these resources may interact with other resources, for example, those provided by the cloud platform provider. Certain data resources may be used to control external systems.

When providing access to cloud-based computing services and data resources, such as a data processing platform for performing said one or more tasks, an authentication service may be provided that typically provides a basic login workflow. Some external organizations utilizing the cloud-based services may have peculiar requirements for login flows, for example, in terms of the protocols they implement, the complex organizational structure they represent, and/or the various compliance/auditing requirements they impose. For example, some external organizations may wish to enable a login session for their data resources using a simple one-factor authentication method, e.g., username and password. Other external organizations may wish to use multi-factor authentication methods, e.g., by means of sending a challenge to a user device (e.g. mobile phone) or email account for response, after the username and password first-factor has been verified. Some external organizations may wish to require a terms of service agreement to be agreed to by the user before a login session can be established, and so on.

It is also known for platform provider organizations to outsource at least part of their one-factor authentication service or other multi-factor service to external services called Identity Providers (IdP). In this way, the user authenticates themselves, e.g., with username and password (and second factor information if desired), to the IdP via a webpage, and the returned page contains a form with a success or failure assertion which is then submitted to the provider organization's login webpage for establishing a login session, if successful. This can avoid the provider organization having to provide at least part of the infrastructure of an authentication service.

In some platforms, platform authentication systems are implemented as an application server and services that act as a service provider that manages access to applications that are provided by the platform, based on a set of users that are connected through an identity provider. Platform authentication systems may also operate as permissioning systems that limit users to permissions specified by organizations whose users use the platform. As such, users (including applications or other services) of client applications and/or the applications in the platform are authenticated. Each authentication source such as external identity providers or internal authentication sources that are internal to the platform are sometimes referred to as a realm. For example, some deployments might have a Lightweight Directory Access Protocol (LDAP) based realm used for customer authentication and the platform may have an internal realm for administrators of the platform. External identity providers (IdPs) validate credentials for a user and provide user identifiers and permissions such as user group information and other attributes to the authentication system of the platform.

For example, an identity provider is a source for user and group information and attributes. An external identity provider gives applications the ability to validate users or services as they login and understand information about these users. As one example, security assertion markup language (SAML) is an XML based data format used to exchange authentication and authorization data between a service provider in the platform, such as an authentication system, and an identity provider. One type of authentication operation carried out by the identity provider is a single sign-on from a web browser and may rely on a user agent (the browser) to exchange data between the service provider and the IdP.

Each realm or IdP is a source of users and/or groups. For example, a realm can originate from an external identity provider or from an internal identity provider and every user or group belongs to one and only one realm. An internal realm which is internal to a computing platform are users in groups that are created and mutated by a platform's own API through, for example, a platform administrator. External realms are those users in groups that are provided by each different external identity provider. Typically, authentication systems within a data processing platform can only update users and group information for external realms at user login. There exists a possibility that the information that the authentication system has is stale, meaning that the authentication system does not actually have user or group data that accurately reflects a state in the external identity provider. One example occurs when a user is removed from a group. Unless the user actually logs in, the change in group membership may not be reflected in the authentication system. Having users logged in who retain stale permissions can potentially invoke security issues.

Also, since each identity provider is set up as a separate realm (e.g., a source of user and/or groups of users) in the platform authentication system, current platform authentication systems cannot add users from other realms. For example, conventional platform authentication systems employ a one-to-one mapping between a user identity for a user and the set of credentials for the user identity, tied to a specific IdP and internal platform user identifier. There is a desire to improve migration from one external identity provider to another external identity provider and maintain suitable permissions. Where a same user has access to the data processing platform via two different external identity providers, the platform authentication system creates two different unique platform identifiers that are managed as separate platform user identities resulting in additional network traffic and complexity.

Hence it is highly desirable to improve platform authentication operation that accommodates access permission to platform resources from different external realms and/or internal realms, for example in an automated way and/or which mitigates the above issues of additional network traffic and complexity.

3. SUMMARY

Certain embodiments of the present disclosure are directed to establishing access sessions in computing platforms. More particular, some embodiments of the present disclosure provide systems and methods for authenticating users of a data processing platform that interfaces with a plurality of identity providers and employs a single entity approach when dealing with same users that have access identifiers from different external (and/or internal) IdPs. Embodiments may mitigate or avoid producing the additional network traffic and complexity associated with conventional systems.

In some examples, a platform authentication system employs a single entity approach that maps multiple external identity provider identifiers from different realms together for resource permissioning purposes. In certain examples, a platform authentication system maps multiple discrete external identity provider IDs from different realms by at least one of: (1) mapping a single unique multi-realm user ID to multiple identity provider IDs from different realms, and/or (2) linking multiple unique platform user IDs from different external identity providers together as a single entity. In some examples, the external identity provider IDs uniquely identify a user to a platform authentication system and include user group information and associated permissions. In certain examples, a platform authentication system merges permissions from the different identity provider IDs from different realms. In some examples, a platform authentication system generates a unique single multi-realm user identifier that links, such as through a table, to different provider IDs from different realms. In some examples, a platform authentication system links multiple existing unique platform user IDs together as a single permission entity through an alias table.

According to certain embodiments of the present disclosure, a method for authenticating users of a data processing platform stores a mapping of a unique user platform identifier to at least a first user identity provider identifier associated with a first external identity provider of a first realm and at a least second user identity provider identifier associated with a second external identity provider of a second realm for a same user. In some examples, the method includes receiving a request from a client device to establish an access session to perform one or more actions on data of the data processing platform and receiving, from at least one of the first external identity provider of the first realm or the second external identity provider of the second realm, a user identity provider identifier associated with the request. In certain examples, the method includes granting permission to perform the one or more actions on the data of the data processing platform based at least in part on the received user identity provider identifier, wherein the method is carried out by one or more processors.

According to some embodiments, a system for authenticating users of a data processing platform includes one or more processors and memory that includes stored executable instructions that when executed by the one or more processors to cause the system to store a mapping of a unique user platform identifier to at least a first user identity provider identifier associated with a first external identity provider of a first realm and at least a second user identity provider identifier associated with a second external identity provider of a second realm for a same user. In some implementations, the system is configured to receive a request from a client device to establish an access session to perform one or more actions on data of the data processing platform and receive, from at least one of the first external identity provider of the first realm or the second external identity provider of the second realm, a user identity provider identifier associated with the request. In certain embodiments, the system is configured to grant permission to perform the one or more actions on the data of the data processing platform based at least in part on the received user identity provider identifier.

According to some embodiments, a method for authenticating users of a data processing platform includes receiving a first request from a first client device to establish a first access session to perform one or more first actions on first data of the data processing platform, receiving, from a first identity provider of a first realm, at least a first authentication identifier associated with the first request, receiving a second request from a second client device to establish a second access session to perform one or more second actions on second data of the data processing platform and receiving, from a second identity provider of a second realm, at least a second authentication identifier associated with the second request. In certain embodiments, the method includes granting permission to perform the one or more first actions on the first data and the one or more second actions on the second data using a single unique user platform identifier that maps to both the at least first authentication identifier and the at least second authentication identifier for a same user, wherein the method is carried out by one or more processors.

In some embodiments, resource permissions from different external identity providers in different realms for the same user are shared in the data processing platform using a single unique user platform identifier (UUPID) (also referred to as a multi-realm identifier). In certain embodiments, a platform authentication system creates a table that stores the unique UUPID and a list of associated (e.g., for the same user) external and/or internal identity provider IDs (IdPID) including group memberships. In some embodiments, the platform authentication system assigns unique user IDs (UUIDs) for each IdP ID and links them together to maintain separate identities in the platform but merges their permissions. In certain embodiments, a linking table is used.

Depending upon the embodiment, one or more benefits may be achieved. These benefits and various additional benefits can be fully appreciated with reference to the detailed description and accompanying drawings that follow.

4. BRIEF DESCRIPTION OF THE DRAWINGS

The implementations will be more readily understood in view of the following description when accompanied by the below figures, wherein like reference numerals represent like elements, and wherein.

5. DETAILED DESCRIPTION

With conventional authentication systems, each identity provider is set up as a separate realm (e.g., a source of user and/or groups of users) in the platform authentication system and current platform authentication systems cannot add users from other realms. For example, conventional platform authentication systems employ a one-to-one mapping between a user identity for a user and the set of credentials for the user identity, tied to a specific IdP and internal platform user identifier. Where a same user has access to the data processing platform via two different external identity providers, the platform authentication system creates two different unique platform identifiers that are managed as separate platform user identities resulting in additional network traffic and complexity.

In some embodiments, benefits include significant improvements, including for example, reduced complexity in managing resource access for a user having access to platform resources through different IdPs of different realms, an ability to migrate a same user across realms, improved security and more consistent granting of access based on permissions from multiple IdPs. For example, some benefits of the authentication system allow the migration from one external authentication provider to a different external authentication provider within the data processing platform so that the same permissions from one external provider can be attributed to the user ID of another. As such, the user can login through a new system and retain permissions that they were previously granted through a different external identity provider. In other examples, a user can login through two different providers and have the same permissions applied to both. In another example, if a user has left the platform, a customer may wish their direct supervisor to be granted access to everything that the former user was working on and the system allows such operation. When a user migrates from one identity provider to another, the system through the timeout mechanism allows automatic elimination of stale access. Other benefits will be recognized by those of ordinary skill in the art. In one example, a user interface is provided by the authentication system to allow selection of the type of conflict resolution that the customer wants to have applied for a user that has user IDs from differing identity providers.

In certain embodiments, one or more solutions rooted in computer technology overcome one or more problems specifically arising in the realm of computer technology. Some embodiments are directed to computing platforms that include authentication systems that provide access to platform resources for same users from different external and/or internal identity providers by merging permissions and/or using a simple unique user platform identifier. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to establishing access sessions, for example login sessions. A login session includes a session between a client and another system, e.g., a data processing platform server, in which a user may perform one or more actions on data of the data processing platform following authentication of login credentials. Actions may vary from reading, authoring, editing, transforming, merging, or executing one or more data resources. In some embodiments, a login session may have associated attributes, limiting the user's session to only a subset of possible actions and/or for a subset of data resources.

In some embodiments, embodiments relate to establishing access sessions within an existing login session. This may occur when, for example, a user is logged in already, but makes a request "in-session" to perform an action for which they do not have the required privileges. In such cases, they may need to perform some further authentication in order to elevate their current login session to one that permits the requested actions. As such, although example embodiments focus on establishing login sessions from anew, they can be modified to provide access sessions "in-session."

For example, a "data resource" as used herein may include any item of data or code (e.g., a data object) associated with the data processing platform that can be used by one or more computer programs. In some embodiments, data resources are stored in one or more network databases and are capable of being accessed by applications hosted by servers that share common access to the network database. A data resource may, for example, be a data analysis application, a data transformation application, a report generating application, a machine learning process, a spreadsheet or a database, or part of a spreadsheet or part of a database, e.g., records.

Some embodiments involve actions performed at or in association with an authentication system 104 (see FIG. 1) which controls whether or not to permit login or access sessions for users to enable one or more actions on one or more data resources based on a predetermined login workflow and, if so, may, in some embodiments, restrict which resources can be accessed and/or which actions can be taken on resources, based on the context of a login request. In some examples, the authentication system may be provided as an application within the platform or within an organization that provides access to a data processing platform.

Figure 1:
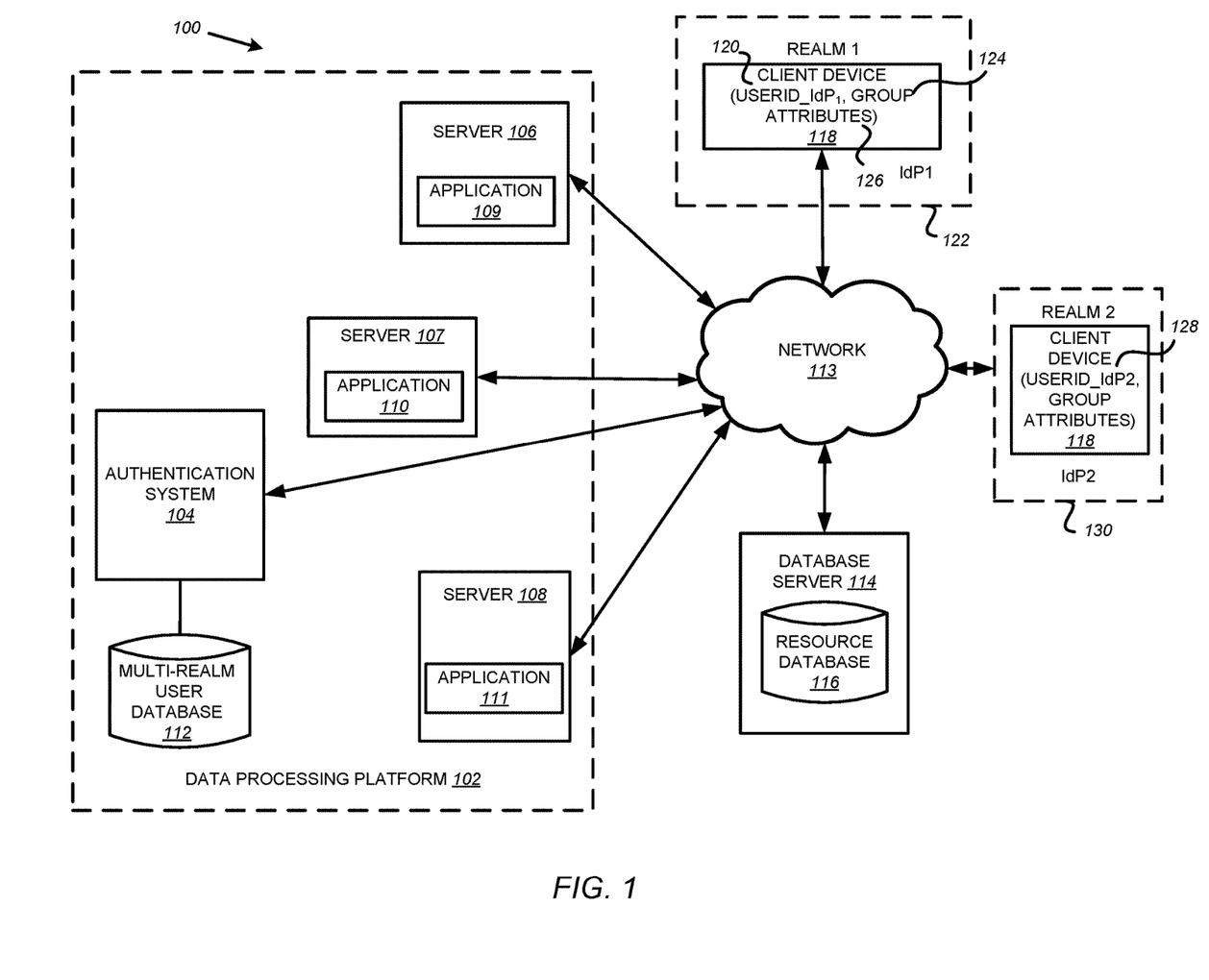
FIG. 1 is a simplified block diagram showing a system for processing data that includes a data processing platform according to one embodiment of the present disclosure.

FIG. 1 is a network diagram depicting a network system 100 that includes a data processing platform 102 that includes an authentication system 104 that is configured for evaluating access permissions for data resources to which a group of application servers 106-108 share common access according to some embodiments. In certain embodiments, the network system 100 may employ a client-server architecture, though is not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed and operation may be combined or distributed as desired.

In certain examples, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers, and in certain embodiments, fewer or additional servers and applications may be included.

According to some examples, each of the servers 106-108 are in communication with the authentication system 104 over a network 113 (e.g. the Internet or an intranet). Each of the servers 106-108 are further shown to be in communication with a database server 114 that facilitates access to one or more resource databases 116 over the network 113, though in other embodiments, the servers 106-108 may access the resource database 116 directly, without the need for a database server 114. In some embodiments, the resource database 116 is one or more databases that store data resources that may be used by any one of the applications 109-111 hosted by the data processing platform 102.

According to certain examples, the authentication system 104 is configured to handle login requests received from users, through one or more client devices 118, that may be within a different logical part of the network. For example, the client device 118 may be logically (from a network point of view) separate from the authentication system and hence may have a different IP or MAC address and/or will utilize communications with the authentication system 104 via a browser with a specific browser identifier, for example as or within a cookie. If one or more login challenges sent to the client device 118 are all successfully responded to, the authentication system 104 is configured to establish a login or access session for the user of the client device 118 to perform actions on data resources on any one or more of the applications 109-111 and the resource database 116. The user may login through the differing IdPs through a different client device or the same client device. A user is also considered to be an application or other service that desires access to one or more resources in the resource database 116.

In some examples, within an established login or during an access session, to access data resources from the resource database 116, the servers 106-108 transmit access requests via the network 113 to the authentication system 104. For example, an access request includes a data resource identifier and a user identifier corresponding to a user (also referred to herein as, e.g., a "requesting user") who may be utilizing one of the applications 109-111 to access to the data resource (also referred to herein as, e.g., a "requesting application"). As an example, the authentication system 104 may include an application programming interface (API) or other machine interface to receive such access requests from the server 106-108 hosting the requesting application 109-111.

In certain examples, upon receiving an access request for a particular data resource, the authentication system 104 accesses a separately stored policy object associated with the particular data resource. Policy objects are stored in a database of the authentication system 104, which is maintained independently of the resource database 116. The policy objects in some examples reflect merged permission data as further described below.

According to some examples, the authentication system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

In some examples, as shown, the network system 100 also includes a client device 118 in communication with the data processing platform 102 and the network-based permissioning system 104 over the network 113. The client device 118 communicates and exchanges data with the data processing platform 102 (also referred to herein as a computing platform).

In certain examples, the client device 118 may be any of a variety of types of devices that include at least a display, a processor, and communication capabilities that provide access to the network 113 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, in one example, the authentication system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

In some embodiments, the computing platform 102 includes a cluster computing platform including one or more server or host machines. In some examples, the computing platform 102 includes a distributed computing platform that allows the one or more device clients 118 to distribute applications and/or data over the network 113 to a cluster of servers or host machines. In certain examples, the computing platform 102 includes a cloud computing platform that allows the one or more device clients 118 access to remote servers, data storages, networks, devices, applications and/or data resources over the network 113. For example, multiple users through the one or more client devices 118 store data at the data storages of the cloud computing platform. In other examples, the computing platform 102 is associated with a platform provider that provides the platform to multiple customers. For example, customers of the computing platform 102 include individuals, organizations and/or commercial companies.

In certain embodiments, the one or more servers or host machines are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region are isolated from any other zone within the region. In one example, each zone within a region is connected with any other zone within the region through low-latency links. In some examples, the computing platform 102 is configured to not replicate applications and/or resources across different regions. For example, each region is completely independent from any other region of the computing platform 102.

According to some embodiments, the computing platform 102 includes a container-orchestration platform. In some examples, the container-orchestration platform allows for automated deployment, scaling and/or operations of containers across the platform. For example, the container-orchestration platform employs the containers across one or more instances of the computing platform 102.

The authentication system 104 employs a multi-realm single user database 112 which may be implemented as any suitable data mapping structure including tables, associative databases or any other suitable form of data structure that maps information as described herein. In one example, a same user has multiple identities from different identity providers (e.g., realms) and the authentication system 104 stores in the multi-realm single user database 112, a unique user platform identifier (UUPID) that is mapped to a first identity provider identifier 120 (e.g., an IdP ID is registered with IdP 122) that is associated with an external identity provider 122 of a first realm and is associated with another external identity provider 130 of a second realm that was registered with the authentication system 104 by the different identity provider but for the same user. Once an identity provider authenticates a particular user, the corresponding user ID (USERID_IdP1) along with associated permissions such as group member information 124 and other attributes 126 including data representing a realm from which the IdP is in, is sent to the authentication system 104 through the network 113. The same user has another, and different user ID 128 associated with another external identity provider 130 in another realm (e.g., realm 2). The authentication system 104 may be implemented, for example, as one or more processors that execute instructions stored in memory (see, for example, FIG. 5) that when executed, cause the authentication system to operate as described herein. The data processing platform 102 likewise is considered to be a system and may be implemented using one or more processors that execute stored instructions that when executed, cause the one or more processors to operate as described herein.

In one example, the authentication system provides a user interface that allows an internal platform operator or external customer to map, for a same user, the differing user identity provider identifiers 120 and 128 from the different external identity providers. The authentication system maps a unique user platform identifier (UUPID) to the user identity provider identifiers 120 and 128 from the different identity providers from the different realms so that the authentication system 104 recognizes that particular external and/or internal user identities should be considered a single entity for resource permissioning purposes. The unique user platform identifier is stored in the multi-realm single user database 112 in the form of a database entry or table entry as further described below. Group membership and attribute information 124, 126 as well as the group and attribute information provided by the identity provider 130 are provided upon login and stored by the authentication system in the multi-realm single user database 112 or in any other suitable format or location to facilitate proper permissioning of resources.

The authentication system 104 receives a request from a client device to establish an access session to perform one or more actions on data of the data processing platform. For example, the authentication system is configured to receive login requests from one or more client devices 118, such as external client devices, that may access the platform via a public network such as the internet or intranet. The authentication system 104 in some examples, includes one or more user managers that may be micro applications or micro services configured to operate separately from, but in association with, as part of the authentication system according to protocol consistent with the authentication system for intercepting login requests from the one or more client devices and applying custom logic to the login workflow to, for example, redirect the login request to the identity provider that the client device (e.g., application under the control of the client device, user of the client device or other entity) has employed. User managers, as known, may be associated with external customer organizations and customer organizations may require customized logic workflows particular to their particular needs in terms of protocols and implement the complex organization structure they represent, and/or the various compliance/auditing requirements they impose. So, for example, an external customer organization may require two factor authentication for all or just some of its users and possibly for all or some actions on all or some data. The user manager and thereafter when a user of the organization sends a login request to the authentication system, the authentication system identifies the user as requiring diversion to the user manager for enhanced login workflow before deciding on whether to allow or deny the request of the login session, in some examples.

As such, in some implementations, when the authentication system 104 receives a request from a client device to establish an access session to perform one or more actions on the data of the data processing platform 102, the request is redirected to the appropriate external identity provider. In some examples, the IdP then performs first or second level authentication as desired and when the authentication is correct, sends the user ID IdP1 120, associated group member information 124, realm information identifying which realm the IdP is in and sends the information to the authentication system as a follow up to the initial request. As such, the authentication system 104 receives from the external identity provider 122 of the first realm the user identity provider identifier 120 as associated with the initial request. The authentication system 104 grants permission to perform the one or more actions on the data of the data processing platform based at least in part on the received user identity provider identifier 120. For example, the authentication system grants permission to perform the one or more actions on the data of the data processing platform by determining if the received user identity provider identifier 120 matches either of the first user identity provider identifier or the second user identity provider identifier that is mapped to the unique user platform identifier in the multi-realm single user database 112. If there is a match, the authentication system 104 uses the unique user platform ID within the data processing platform as a unique user identifier for granting permissions to resources of the data processing platform during the access session. The multi-realm single user database 112 in one example, has a one to many mapping of the unique user platform identifier to multiple user identity provider identifiers from differing identification providers associated with differing realms.

In another example, the multi-realm single user database 112 stores unique user platform identifiers that correspond to each of the differing realm identifiers 120 and 128 for the same user by creating a unique user platform identifier for the user identity provider identifier 120 and another unique user platform identifier corresponding to the identity provider identifier 128 from the other external identity provider. In certain implementations, the user identity provider identifiers 120 and 128 is linked, in one example, through a table, to each other along with their corresponding group information and attributes so that the permissions provided by each of the identity providers are linked. As such, when the same user logs in through a different realm (e.g., using a different IdP), the authentication system 104 looks in the multi-realm single user database 112 for the user identity provider identifier that was received to see if there is a match and if so, which other identifiers for the same user are linked. Permissions corresponding to the different user identity provider identifiers are considered so that a more uniform approach is used for the same user across differing identity providers (e.g., across multiple realms).

Figure 2:
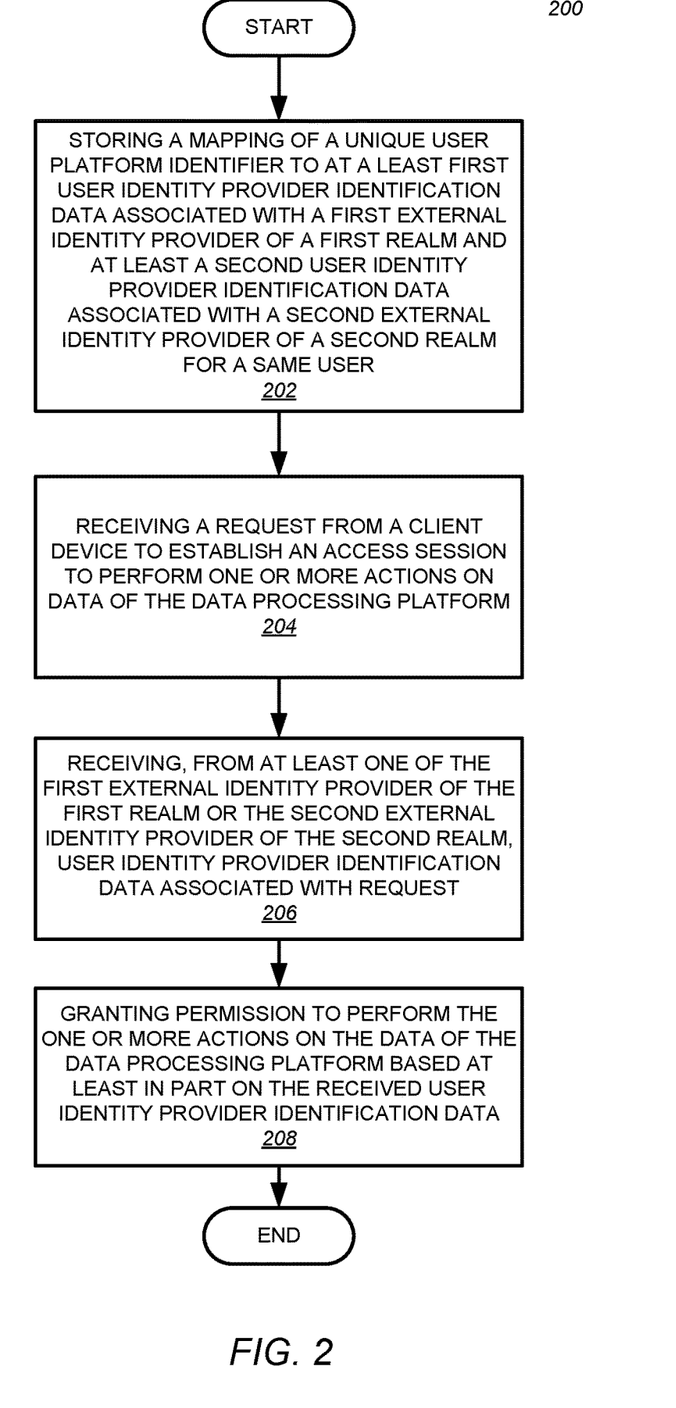
FIG. 2 is a simplified diagram showing a method for authenticating users of a data processing platform according to one embodiment of the present disclosure.
Figure 3:
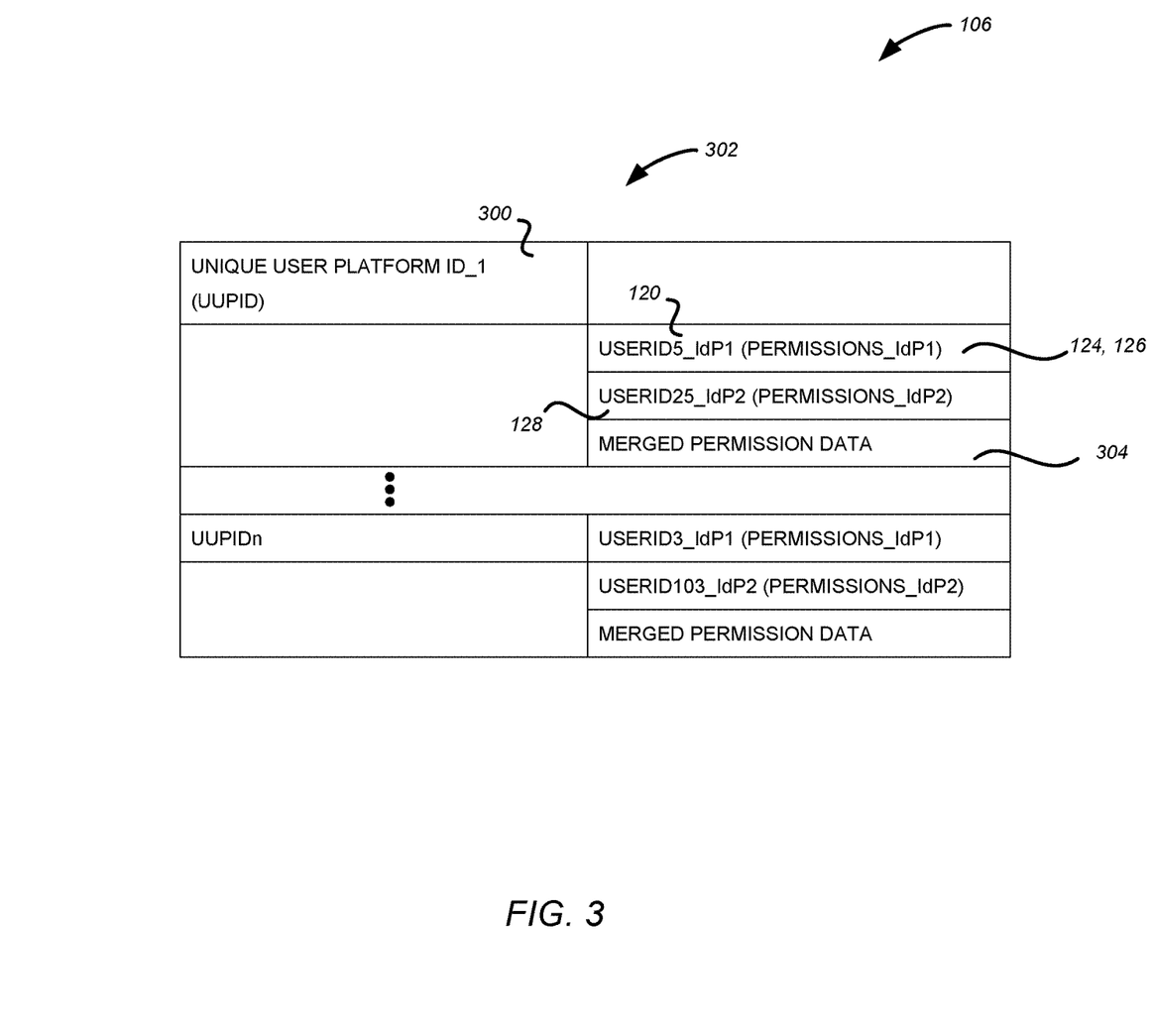
FIG. 3 is a diagram illustrating one example mapping a unique user platform identifier to a plurality of user identity provider identifiers from a plurality of external identity providers according to one embodiment of the present disclosure.
Figure 4:
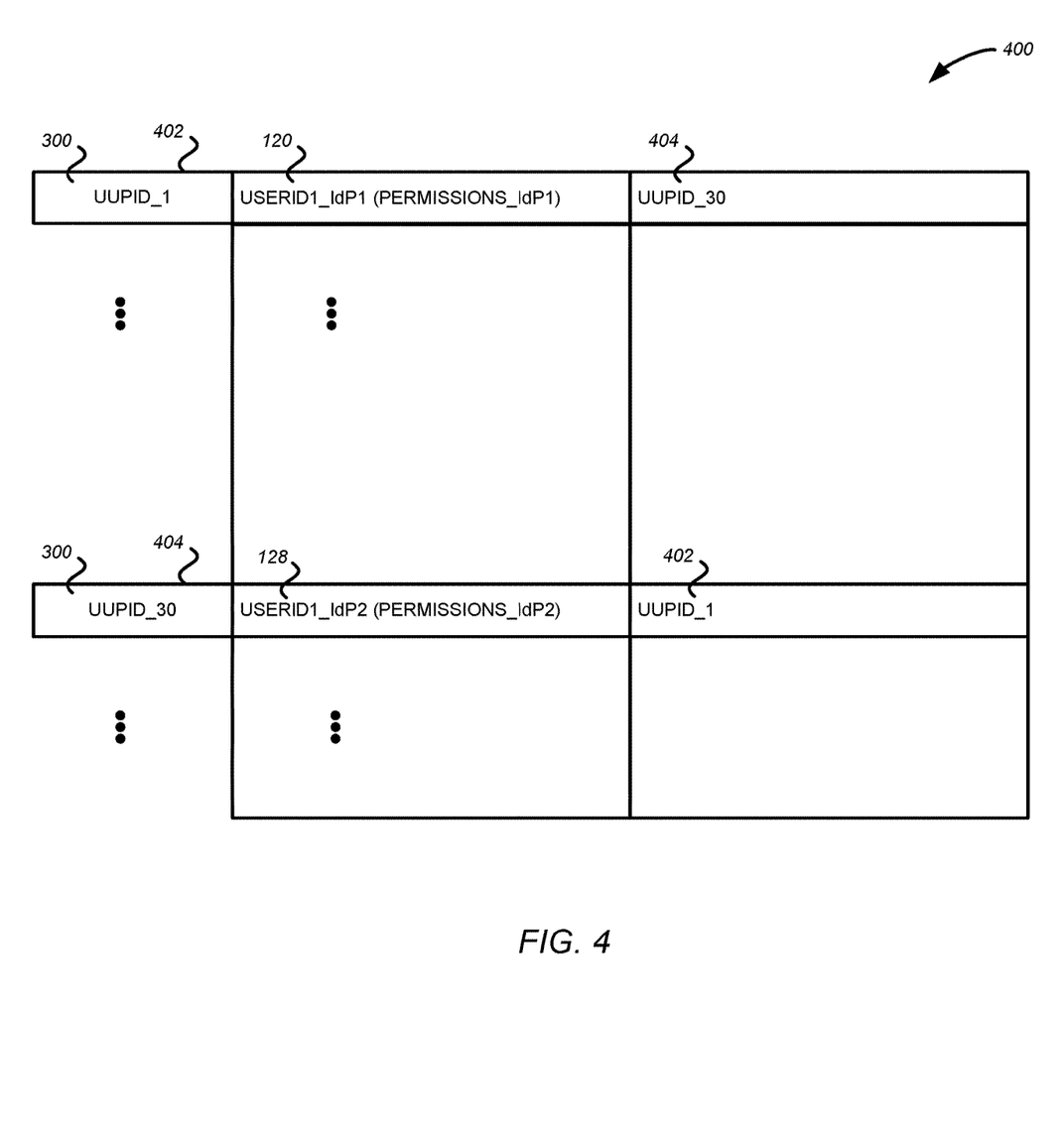
FIG. 4 is a diagram illustrating one example mapping a unique user platform identifier to a plurality of user identity provider identifiers from a plurality of external identity providers according to one embodiment of the present disclosure.

FIG. 2 illustrates a method 200 for authenticating users of a data processing platform that in one example, is carried out by the authentication system 104, however any suitable component may be employed. This diagram is merely an example, which should not unduly limit the scope of the claims. One of ordinary skill in the art would recognize many variations, alternatives and modifications. FIGS. 3 and 4 illustrate differing examples of mapping of a unique user platform identifier for a same user to multiple user identity provider identifiers 120 and 128 (e.g., USERID_IdP1 and USERID_IdP2) and their associated group member information and attributes as provided by the different external identity providers from different realms. These diagrams are merely examples which should not unduly limit the scope of the claims. One of ordinary skill in the art would recognize many variations, alternatives and modifications. As used herein, permissions include data representing the group information and attributes such as permission attributes indicating levels of access to resources, the type of permissions allowed (read, write, for example) and any other data needed for proper granting of access to requested resources. Each user identity provider identifier 120 and 128 for the same user from each of the differing identity providers, in one example, is configured as individual user objects. In other examples, a unique user platform identifier is a user object with links to the user objects corresponding to the user identity provider identifiers from each of the different identity providers. However, any suitable architecture may be employed. In some examples, database entries are used to provide mapping. In certain implementations, tables are used to provide mapping. However, any suitable mapping structure may be employed. In some implementations, the user identity provider identifier may be user name, email address or any other data that is agreed upon by the identity provider and the authentication system to uniquely identify a user.

As shown in block 202, the method includes storing a mapping of a unique user platform identifier (UUPID) 300 (see e.g., FIG. 3 and/or FIG. 4) which may be generated in any suitable manner, including for example, through random number generation, one way hash function of the user identity provider identifier, namely the USERID_IdP1 or USERID_IdP2, or any other operation that produces a unique identifier.

In one example, the multi-realm single user database 112 stores a unique user platform identifier 300 that maps, for the same user, differing user identity provider identifiers 120 and 128 from external identity providers from different realms and/or different internal realms within the platform 102 as shown by table 302. The user identity provider identifier, in some examples may include just the data USERID_IdP1 120 and USERID_IdP2 128 or the combination of the permissions including data representing the group and other attributes. In some examples, the permissions are updated on each login. The user identity provider identifiers in the table 302 are the user identifiers that are agreed upon by the external identity providers 122 and 130 with the authentication system 104 and are provided through a user interface or any other mechanism. As shown in the example of FIG. 3, the unique user platform identifier 300 is mapped, to USERID5 that is associated with the identity provider 122 and USERID25 that is associated with identification provider 130 for the same user.

As shown in block 204 of FIG. 2, the authentication system 104 receives a request from a client device to establish an access session to perform one or more actions on data in the data processing platform 102, or through other service redirects the request to the proper identity provider. As shown in block 206, the method includes receiving from the external identity provider that performed the identity verification, a user identity provider identifier (e.g., USERID5) associated with the request so that depending upon which identity provider is involved, the corresponding user identity provider identifier from that identity provider (e.g., 120 or 128) is provided to the authentication system. As shown in block 208, the authentication system 104 grants permission to perform the desired action based on the received user identity provider identifier. In one example, the authentication server 104 grants access by looking in the table 302 for a user identity provider identifier that matches the received user identity provider identifier and if found in the table, uses the unique user platform identifier 300 as the user identifier within the platform for subsequent access requests during the session. In some implementations, the merged permission data 304 is used as the policy information for granting access.

The unique user platform ID 300 is a unique ID used by the authentication system to map information received from an external provider to a user or group and stores a one to many mapping from multiple identity providers. The user identity provider identifier from multiple identity providers are mapped to, in one example, the unique user platform ID 300 on a user level or group level if desired. In this example, the table 302 includes merged permission data 304 for each unique user platform identifier 300. The merged permission data is the result of a conflict resolution operation between the permission information sent by the differing identity providers as part of the login process, or as part of the initial registration and mapping process.

The authentication system 104 distinguishes between user and group attributes received from the differing external identity providers and in some examples, stores the attributes and prioritizes whether the group attributes will govern during an access request or whether user attributes govern. In other examples, a particular external identity provider is given priority so that the permissions provided by a higher priority external identity provider serve as the merged permission data and are used when the other user ID from the other provider is being used by the same user. In another conflict resolution example, if no external provider is prioritized, the authentication system returns permission attributes for the granting decision from the most recent identity provider. On a user basis, this would be the identity provider of the most current user session. In other examples, group membership permission is also determined by the most recent identity provider. For example, if the authentication system is operating on a user and the user has access via identity provider 122 and identity provider 130, but the user logs into the authentication system via identity provider 130, the user loses membership in all external groups unique to identity provider 122. This may be necessary in order to address staleness such as to prevent users from retaining access that they have lost in an external provider. In other embodiments, a timeout period is provided as part of the table 302 for each permission set so that the permissions automatically expire after a predetermined period of time. Any other suitable conflict resolution operations may also be employed.

In some embodiments, granting permission to perform actions on a data of the data processing system includes determining if the received user identity provider identifier associated with the request matches either of the user identity provider identifiers from the differing identity providers 120, 128, in this example, that are mapped to the unique user platform identifier 300 and if so, using the unique user platform identifier 300 for granting permissions to resources during the access session using the merged permission data 304. The merged permission data may be one or more permissions from either of the stored information from the differing identity providers or combinations thereof or subsets thereof, or any suitable permission. The authentication system creates the unique user platform identifier 300 as mapped to the user identity provider identification information from the differing external identity providers through the mapping table 302 or any other suitable mechanism.

As shown in FIG. 4, in certain embodiments, a linking table 400 is employed such that multiple unique platform IDs for the same user are linked together via the linking table 400. In this example, the unique user platform identifier 300 includes a unique identifier that is mapped to user IDs from the differing identity providers. As shown in this example, a different unique user platform identifier 402 and 404 are used as the unique user platform identifier 300 such that linking of differing user IDs from differing identity providers for the same user is employed. As illustrated, the user provider identifier has been registered for each external identity provider as listed in a table. A linking table includes data or other linking mechanism that links other user IDs registered for other external identity providers for the same user. In one example, the authentication system 104 assigns a user platform identifier 402 to user identity provider identifier 120 and another user platform identifier 404 to the user identity provider identifier 128 associated with the other external identity provider and links the two through the linking table 400. The authentication system then uses one of the linked platform identifiers to grant permission based on the merged permissions between the linked identifiers similar to that described above. For example, a user session under UUPID_1 also receives the same permissions granted to UUPID_30 and vice versa, after conflicts are resolved. Also, the system 104 in one example is configured so that a linked alias times out after a configurable period of time which attempts to address the problem of stale permissions being maintained within the system. For example, a time period is assigned on a permission basis or user ID basis.

Figure 5:
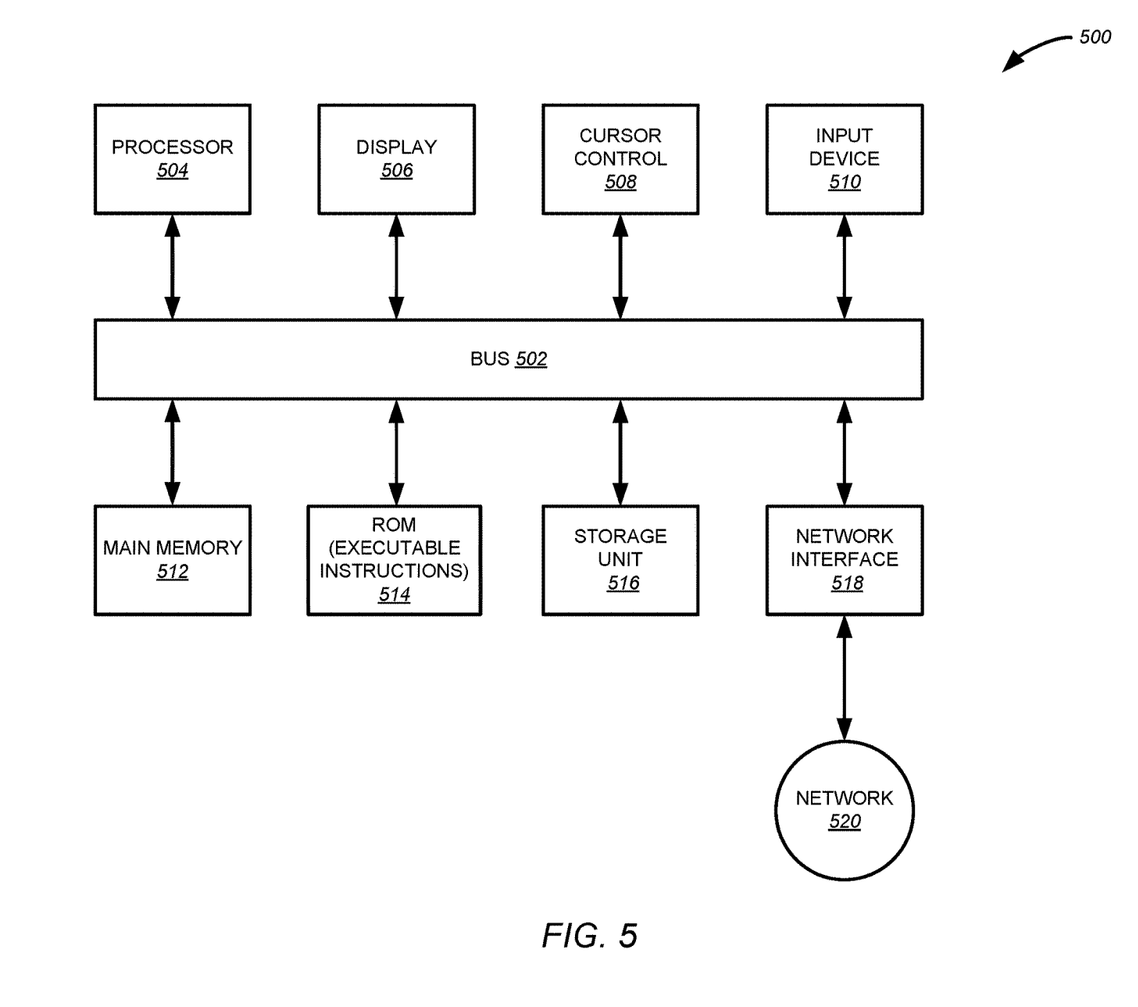
FIG. 5 is a simplified diagram showing a computing system for implementing a system for authenticating users of a data processing platform according to one embodiment of the present disclosure.

FIG. 5 is a simplified diagram showing a computing system for implementing components of the system 100 according to one embodiment of the present disclosure. This diagram is merely an example, which should not unduly limit the scope of the claims. One of ordinary skill in the art would recognize many variations, alternatives, and modifications. The computing system 500 includes a bus 502 or other communication mechanism for communicating information, a processor 504, a display 506, a cursor control component 508, an input device 510, a main memory 512, a read only memory (ROM) 514, a storage unit 516, and a network interface 518. In some embodiments, some or all processes (e.g., steps) of the method 400, the method 500, and/or the method 600 are performed by the computing system 500. In some examples, the bus 502 is coupled to the processor 504, the display 506, the cursor control component 508, the input device 510, the main memory 512, the read only memory (ROM) 514, the storage unit 516, and/or the network interface 518. In certain examples, the network interface is coupled to a network 520 or (not depicted) network 113. For example, the processor 504 includes one or more general purpose microprocessors. In some examples, the main memory 512 (e.g., random access memory (RAM), cache and/or other dynamic storage devices) is configured to store information and instructions to be executed by the processor 504. In certain examples, the main memory 512 is configured to store temporary variables or other intermediate information during execution of instructions to be executed by processor 504. For examples, the instructions, when stored in the storage unit 516 accessible to processor 504, render the computing system 500 into a special-purpose machine that is customized to perform the operations specified in the instructions. In some examples, the ROM 512 is configured to store static information and instructions for the processor 504. In certain examples, the storage unit 516 (e.g., a magnetic disk, optical disk, or flash drive) is configured to store information and instructions.

In some embodiments, the display 506 (e.g., a cathode ray tube (CRT), an LCD display, or a touch screen) is configured to display information to a user of the computing system 500. In some examples, the input device 510 (e.g., alphanumeric and other keys) is configured to communicate information and commands to the processor 504. For example, the cursor control 508 (e.g., a mouse, a trackball, or cursor direction keys) is configured to communicate additional information and commands (e.g., to control cursor movements on the display 506) to the processor 504.

In some embodiments, some or all processes (e.g., steps) of the method 200 are performed by the data processing platform 120. In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, a method for authenticating users of a data processing platform includes storing a mapping of a unique user platform identifier to at least a first user identity provider identifier associated with a first external identity provider of a first realm and at least a second user identity provider identifier associated with a second external identity provider of a second realm for a same user. The method further includes receiving a request from a client device to establish an access session to perform one or more actions on data of the data processing platform, from at least one of the first external identity provider of the first realm or the second external identity provider of the second realm. The method also includes a user identity provider identifier associated with the request and grants permission to perform the one or more actions on the data of the data processing platform based at least in part on the received user identity provider identifier, wherein the method is carried out by one or more processors. For example, the method is implemented according to at least FIGS. 1, 2, 3, 4 and/or FIG. 5.

In certain examples, the method further includes granting permission to perform the one or more actions on the data of the data processing platform by determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

In some examples, the method further includes storing a mapping of a unique user platform identifier by creating the unique user platform identifier as mapped to both the at least first user identity provider identifier associated with the first external identity provider of the first realm and the at least second user identity provider identifier associated with the second external identity provider of the second realm.

In certain examples, the method further includes storing a mapping of a unique user platform identifier by assigning a first user platform identifier to the first user identity provider identifier associated with the first external identity provider of the first realm and assigning a second user platform identifier to the second user identity provider identifier associated with the second external identity provider, linking the first user platform identifier to the second user platform identifier to link at least one permission provided from the first external identity provider with at least one permission provided from the second external identity provider and using at least one of either of the linked first user platform identifier or the second user platform identifier to grant permission to perform the one or more actions on the data.

In certain examples, the method further includes granting permission to perform the one or more actions on the data by evaluating permission data associated with the at least first user identity provider identifier and permission data associated with the at least second user identity provider identifier and resolving a conflict among evaluated permissions for the request.

In some examples, the method includes assigning a timeout period to permissions associated with at least one of the first and second user ID provider identifiers.

According to certain embodiments, a system for authenticating users of a data processing platform includes one or more processors and memory including stored executable instructions that when executed by the one or more processors causes the one or more processors to store a mapping of a unique user platform identifier to at least a first user identity provider identifier associated with a first external identity provider of a first realm and at least a second user identity provider identifier associated with a second external identity provider of a second realm for a same user, receive a request from a client device to establish an access session to perform one or more actions on data of the data processing platform, receive, from at least one of the first external identity provider of the first realm or the second external identity provider of the second realm, a user identity provider identifier associated with the request and grant permission to perform the one or more actions on the data of the data processing platform based at least in part on the received user identity provider identifier. For example, the system is implemented according to at least FIGS. 1, 2, 3, 4 and/or FIG. 5.

In some examples, the system further includes stored executable instructions that when executed by the one or more processors causes the one or more processors to grant permission to perform the one or more actions on the data of the data processing platform by at least determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

In certain examples, the system further includes memory including stored executable instructions that when executed by the one or more processors causes the one or more processors to store a mapping of a unique user platform identifier by creating the unique user platform identifier as mapped to both the at least first user identity provider identifier associated with the first external identity provider of the first realm and the at least second user identity provider identifier associated with the second external identity provider of the second realm.

In some examples, the system further includes memory including stored executable instructions that when executed by the one or more processors causes the one or more processors to store a mapping of a unique user platform identifier by assigning a first user platform identifier to the first user identity provider identifier associated with the first external identity provider of the first realm and assigning a second user platform identifier to the second user identity provider identifier associated with the second external identity provider, linking the first user platform identifier to the second user platform identifier to link at least one permission provided from the first external identity provider with at least one permission provided from the second external identity provider and using at least one of either of the linked first user platform identifier or the second user platform identifier to grant permission to perform the one or more actions on the data.

In some examples, the system further includes memory including stored executable instructions that when executed by the one or more processors causes the one or more processors to: grant permission to perform the one or more actions on the data by evaluating permission data associated with the at least first user identity provider identifier and permission data associated with the at least second user identity provider identifier and resolving a conflict among evaluated permissions for the request.

In certain examples, the system further includes memory including stored executable instructions that when executed by the one or more processors causes the one or more processors to assign a timeout period to permissions associated with at least one of first and second user ID provider identifiers.

According to some embodiments, a method for authenticating users of a data processing platform includes receiving a first request from a first client device to establish a first access session to perform one or more first actions on first data of the data processing platform, receiving, from a first identity provider of a first realm, at least a first authentication identifier associated with the first request, receiving a second request from a second client device to establish a second access session to perform one or more second actions on second data of the data processing platform, receiving, from a second identity provider of a second realm for a same user, at least a second authentication identifier associated with the second request, and granting permission to perform the one or more first actions on the first data and the one or more second actions on the second data using a single unique user platform identifier that maps to both the at least first authentication identifier and the at least second authentication identifier, wherein the method is carried out by one or more processors. For example, the method is implemented according to at least FIGS. 1, 2, 3, 4 and/or FIG. 5.

In some examples, the method further includes wherein the first and second client devices are the same device and wherein the method includes storing the single unique user platform identifier as data being logically mapped to both the at least first authentication identifier from the first realm and the at least second authentication identifier from the second realm and wherein granting permission to perform the one or more first actions on the first data and the one or more second actions on the second data includes determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

In certain examples, the method further includes granting permission to perform the one or more actions on the data including evaluating permission data associated with the at least first user identity provider identifier and permission data associated with the at least second user identity provider identifier and resolving a conflict among evaluated permissions for the request.

In some example, the method further includes assigning a timeout period to permissions associated with at least one of the first and second user ID provider identifiers.

Some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for authenticating users of a data processing platform comprising:
storing a mapping of a unique user platform identifier to at least both of a first user identity provider identifier associated with a first external identity provider of a first realm and a second user identity provider identifier associated with a second external identity provider of a second realm for a same user using a multi-realm single user database, the multi-realm single user database comprising a data mapping structure, the data mapping structure comprising the unique user platform identifier, the first user identity provider identifier, and the second user identity provider identifier, the first user identity provider identifier being associated with first permission data, the second user identity provider identifier being associated with second permission data different from the first permission data;
receiving a request from a client device to establish an access session to perform one or more actions on data of the data processing platform;
receiving, from at least one of the first external identity provider of the first realm or the second external identity provider of the second realm, a user identity provider identifier associated with the request;
generating merged permission data using the first permission data and the second permission data;
granting permission to perform the one or more actions on the data of the data processing platform using the received user identity provider identifier and the merged permission data;
wherein the method is carried out by one or more processors.

2. The method of claim 1 wherein the granting permission to perform the one or more actions on the data of the data processing platform comprises:
determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

3. The method of claim 2 wherein the storing a mapping of a unique user platform identifier comprises creating the unique user platform identifier as mapped to both the at least first user identity provider identifier associated with the first external identity provider of the first realm and the at least second user identity provider identifier associated with the second external identity provider of the second realm.

4. The method of claim 1 wherein the storing a mapping of a unique user platform identifier comprises:
assigning a first user platform identifier to the first user identity provider identifier associated with the first external identity provider of the first realm and assigning a second user platform identifier to the second user identity provider identifier associated with the second external identity provider;
linking the first user platform identifier to the second user platform identifier to link a first permission data with the second permission data; and
using at least one of either of the linked first user platform identifier or the second user platform identifier to grant permission to perform the one or more actions on the data.

5. The method of claim 1 wherein the generating merged permission data based at least in part upon the first permission data and the second permission data comprises:
evaluating the first permission data associated with the first user identity provider identifier and the second permission data associated with the second user identity provider identifier; and
resolving a conflict among the first permission data and the second permission data for the request to generate the merged permission data.

6. The method of claim 1 further comprising assigning a timeout period to at least one selected from a group consisting of the first permission data associated with the first user identity provider identifier and the second permission data associated with the second user identity provider identifier.

7. A system for authenticating users of a data processing platform comprising:
one or more processors; and memory comprising stored executable instructions that when executed by the one or more processors causes the one or more processors to:

store a mapping of a unique user platform identifier to at least both of a first user identity provider identifier associated with a first external identity provider of a first realm and a second user identity provider identifier associated with a second external identity provider of a second realm for a same user using a multi-realm single user database, the multi-realm single user database comprising a data mapping structure, the data mapping structure comprising the unique user platform identifier, the first user identity provider identifier, and the second user identity provider identifier, the first user identity provider identifier being associated with first permission data, the second user identity provider identifier being associated with second permission data different from the first permission data;

receive a request from a client device to establish an access session to perform one or more actions on data of the data processing platform;

receive, from at least one of the first external identity provider of the first realm or the second external identity provider of the second realm, a user identity provider identifier associated with the request;

generate merged permission data using the first permission data and the second permission data; and grant permission to perform the one or more actions on the data of the data processing platform using the received user identity provider identifier and the merged permission data.

8. The system of claim 7 wherein the memory comprises stored executable instructions that when executed by the one or more processors causes the one or more processors to:

grant permission to perform the one or more actions on the data of the data processing platform by at least determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

9. The system of claim 8 wherein the memory comprises stored executable instructions that when executed by the one or more processors causes the one or more processors to:

store a mapping of a unique user platform identifier by creating the unique user platform identifier as mapped to both the at least first user identity provider identifier associated with the first external identity provider of the first realm and the at least second user identity provider identifier associated with the second external identity provider of the second realm.

10. The system of claim 7 wherein the memory comprises stored executable instructions that when executed by the one or more processors causes the one or more processors to:

store a mapping of a unique user platform identifier by:
assigning a first user platform identifier to the first user identity provider identifier associated with the first external identity provider of the first realm and assigning a second user platform identifier to the second user identity provider identifier associated with the second external identity provider;

linking the first user platform identifier to the second user platform identifier to a the first permission data with the second permission data; and using at least one of either of the linked first user platform identifier or the second user platform identifier to grant permission to perform the one or more actions on the data.

11. The system of claim 7 wherein the memory comprises stored executable instructions that when executed by the one or more processors causes the one or more processors to: generate merged permission data based at least in part upon the first permission data and the second permission data by:

evaluating the first permission data associated with the at least first user identity provider identifier and the second permission data associated with the at least second user identity provider identifier; and resolving a conflict among the first permission data and the second permission data for the request to generate the merged permission data.

12. The system of claim 7 wherein the memory comprises stored executable instructions that when executed by the one or more processors causes the one or more processors to assign a timeout period to at least one selected from a group consisting of the first permission data associated with the first user identity provider identifier and the second permission data associated with the second user identity provider identifier.

13. A method for authenticating users of a data processing platform comprising:

receiving a first request from a first client device to establish a first access session to perform one or more first actions on first data of the data processing platform;

receiving, from a first identity provider of a first realm, at least a first authentication identifier associated with the first request and first permission data associated with the first authentication identifier;

receiving a second request from a second client device to establish a second access session to perform one or more second actions on second data of the data processing platform;

receiving, from a second identity provider of a second realm for a same user, at least a second authentication identifier associated with the second request and second permission data associated with the second authentication identifier, the second permission data being different from the first permission data;

generating merged permission data using the first permission data and the second permission data; and granting permission to perform the one or more first actions on the first data and the one or more second actions on the second data using a single unique user platform identifier that maps to both the at least first authentication identifier and the at least second authentication identifier using a multi realm single user database, the multi-realm single user database comprising a data mapping structure, the data mapping structure comprising the single unique user platform identifier, the first authentication identifier, and the second authentication identifier, the permission being granted using the single unique user platform identifier and the merged permission data;

wherein the method is carried out by one or more processors.

14. The method of claim 13 wherein the first and second client devices are the same device and wherein the method includes:

storing the single unique user platform identifier as data being logically mapped to both the at least first authentication identifier from the first realm and the at least second authentication identifier from the second realm; and wherein granting permission to perform the one or more first actions on the first data and the one or more second actions on the second data comprises determining if the received user identity provider identifier associated with the request matches either of the first user identity provider identifier or the second user identity provider identifier mapped to the unique user platform identifier and if so, using the unique user platform identifier for granting permissions to resources of the data processing platform during the access session.

15. The method of claim 13 wherein the generating merged permission data based at least in part upon the first permission data and the second permission data comprises:

evaluating the first permission data associated with the at least first authentication identifier and the second permission data associated with the at least second authentication identifier; and resolving a conflict among the first permission data and the second permission data to generate the merged permission data.

16. The method of claim 13 further comprising assigning a timeout period to at least one selected from a group consisting of the first permission data associated with the first authentication identifier and the second permission data associated with the second authentication identifier.

* * * * *